United States Patent [19]
Appolonia et al.

[11] Patent Number: 5,471,846
[45] Date of Patent: * Dec. 5, 1995

[54] APPARATUS AND PROCESS FOR CHILLING FOOD PRODUCTS

[75] Inventors: John J. Appolonia, Yardley; Steve McCormick, Warrington, both of Pa.; Robert Boddaert, Washington, N.J.; Charles Cory, Phoenixville, Pa.

[73] Assignee: The BOC Group, Inc., New Providence, N.J.

[ * ] Notice: The portion of the term of this patent subsequent to Nov. 15, 2011, has been disclaimed.

[21] Appl. No.: 113,934

[22] Filed: Aug. 30, 1993

[51] Int. Cl.$^6$ .............................. F25D 13/06; F25D 17/02
[52] U.S. Cl. .................... 62/63; 62/64; 62/374; 62/380; 62/381; 62/166
[58] Field of Search ................... 62/60, 63, 64, 62/166, 374, 380, 381

[56] References Cited

U.S. PATENT DOCUMENTS

| | | | |
|---|---|---|---|
| 226,390 | 4/1880 | Davis | 62/60 X |
| 1,977,373 | 10/1934 | Birdseye | 62/60 |
| 2,483,100 | 9/1949 | Morrison | 62/60 |
| 2,784,567 | 3/1957 | Reynolds | 62/381 X |
| 3,213,634 | 10/1965 | Granata | 62/381 X |
| 3,292,384 | 12/1966 | Rubin | 62/381 X |
| 4,015,440 | 4/1977 | Pietrucha et al. | 62/166 |
| 4,798,614 | 1/1989 | Aubry et al. | 62/374 |
| 5,186,008 | 2/1993 | Appolonia et al. | 62/63 |

FOREIGN PATENT DOCUMENTS

| | | |
|---|---|---|
| 0242619 | 10/1987 | European Pat. Off. . |
| 0544420 | 6/1993 | European Pat. Off. . |

*Primary Examiner*—Christopher Kilner
*Attorney, Agent, or Firm*—R. Hain Swope; David A. Draegert; Larry R. Cassett

[57] ABSTRACT

Apparatus and method for chilling a food product which includes a food distribution device having a pair of circular members including at least one spaced-apart partition defining a food receiving area; the circular members rotating to cause food delivered to the food product receiving area to fall into a food storage compartment in a uniform manner; and a cryogen releasing device connected to one of the circular members which uniformly distributes a cryogenic substance to the food product within the food storage compartment.

18 Claims, 7 Drawing Sheets

APPARATUS AND PROCESS FOR CHILLING FOOD PRODUCTS

TECHNICAL FIELD

The present invention is generally directed to a device for chilling a food product in which the food product is uniformly distributed within a food receiving vessel while simultaneously being uniformly treated with a cryogenic substance delivered at a rate corresponding to the rate of throughput of the food product into the food receiving vessel.

BACKGROUND OF THE PRIOR ART

Commercial procedures for treating freshly killed poultry or meat generally require that the temperature of the fresh killed product be reduced in accordance with standards established by the United States Department of Agriculture (USDA). Conventionally, the fresh killed product is treated with brine to lower the temperature of the food product to about 45° F. This procedure reduces water loss in the product, prevents the growth of bacteria and extends the shelf life of the food product.

The brine treated product is then cut and/or ground as desired prior to packaging. The cutting/grinding step generates heat thereby increasing the temperature of the food product. Prior to packaging the food product, however, it is necessary to lower the temperature of the food product in the range of from about 30° to 40° F.

Conventional methods of chilling the food product after it has been cut/ground and treated with brine involve manual operations. Specifically, the food product is placed in a large., often times rectangular vessel. Dry ice in the form of pellets is shoveled into the vessel to lower the temperature of the food product to meet USDA requirements.

Such manual systems, however, are inefficient and inconsistent. The shoveling of dry ice into the receiving vessel often produces localized cold spots so that a portion of the food product is chilled to lower than necessary temperatures while other portions of the food product remain above desired temperatures. To date, there is no apparatus or method which uniformly distributes the food product within the storage vessel and uniformly treats the food product with a coolant as it is distributed within the vessel.

A system for uniformly distributing a food product within a food receiving vessel while simultaneously uniformly treating the food product with a cryogenic substance is disclosed by the Assignee herein in John Appolonia et al., U.S. patent application Ser. No. 08/090,347, filed on Jul. 9, 1993 which is incorporated herein by reference. In this system, there is provided a food distribution means which is operatively engaged to the top of a food storage compartment. On the underside of the food distribution means is a cryogen releasing means which releases a cryogenic substance onto the food product in a uniform manner as the food product is uniformly distributed within the food storage compartment.

The above-identified system works well when the food product enters the food storage vessel at a continuous rate. When, however, the food product is supplied at a variable rate, then the cryogen releasing means must be manually adjusted so as to continue to provide the cryogenic substance in desirable amounts.

It would be an advance in the art and particularly an improvement of the food chilling system described above to provide an automated means of adjusting the rate of cryogen input to the food storage vessel in response to the amount of food product entering the food storage vessel.

SUMMARY OF THE INVENTION

The present invention is generally directed to an apparatus and process for chilling a food product in which a cryogenic substance is released at a rate which is dependent upon the rate at which the food product enters the food storage compartment. The position of the food product at the point when the rate is determined may be when the food product leaves the conveyor belt prior to its entry into the food storage compartment or after the food product is released from the conveyor belt and has entered the food storage compartment.

In particular, the present invention is directed to an apparatus and process for chilling a food product which is an improvement over the food chilling apparatus disclosed in John Appolonia et al., U.S. patent application Ser. No. 08/090,347, filed Jul. 9, 1993. The apparatus and process comprise a food storage compartment for receiving the food product from a food distribution means. The food distribution means is adapted to deliver the food product in a uniform manner to the food storage compartment. The food distribution means is operatively engaged at the top of the food storage compartment and serves the function of uniformly distributing the food product within the food storage compartment. On the underside of the food distribution means is a cryogen releasing means. The cryogen releasing means releases a cryogenic substance onto the food product in a uniform manner as the food product is uniformly distributed with the food storage compartment.

The present invention includes a means for adjusting the rate at which the cryogenic substance is released in accordance with the rate at which the food product enters the food storage compartment.

As a consequence of the present invention, the cryogenic substance is released into the storage compartment in an amount which provides optimum cooling in accordance with USDA standards without localized cold spots even if the rate of entry of the food product into the food storage compartment should change.

BRIEF DESCRIPTION OF THE DRAWINGS

The following drawings in which like reference characters indicate like parts are illustrative of embodiments of the invention and are not intended to limit the invention as encompassed by the claims forming part of the application.

DETAILED DESCRIPTION OF THE INVENTION

The present invention is directed to an apparatus and a process for chilling food products, particularly meat and poultry, in an efficient and uniform manner. The food product is distributed within a food storage compartment. A cryogen releasing means is adapted to release a cryogenic substance into the food storage compartment at a rate which corresponds to the rate at which the food product enters the food storage compartment. In accordance with the invention desirable amounts of the cryogenic substance are released even when there are changes in the rate at which the food product is delivered to the food storage compartment.

The apparatus for chilling a food product is similar to that described in John Appolonia et al., U.S. patent application Ser. No. 08/090,347, filed Jul. 9, 1993, but also includes a means for determining the rate of flow of the food product into the storage compartment and also means for delivering the cryogenic substance into the food storage compartment at a rate corresponding to the flow rate of the food product. As a result, a desired amount of the cryogenic substance is continuously supplied to the food storage compartment even when the rate of flow of the food product changes.

Figure 1:
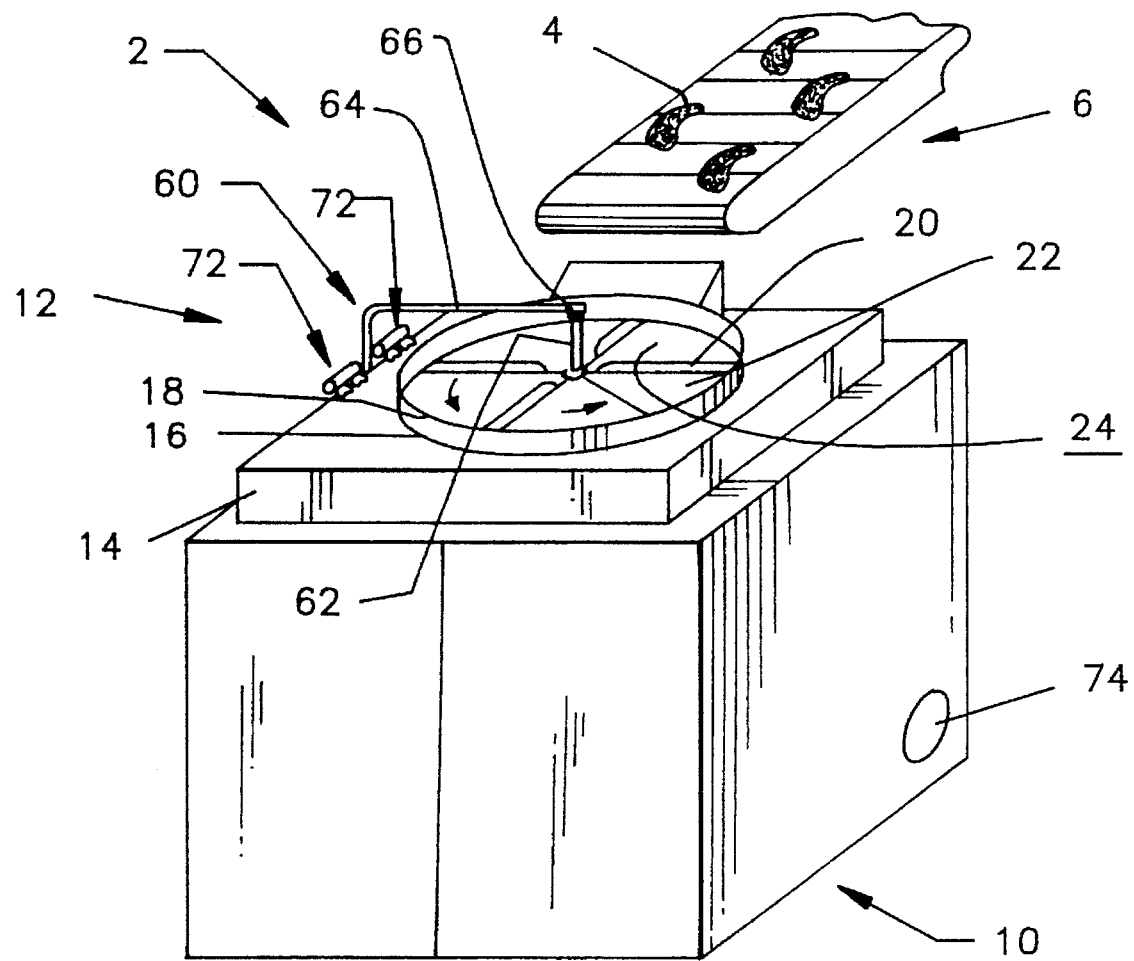
FIG. 1 is a perspective view of an embodiment of the invention for chilling a food product received from a conveyor.

Referring to FIG. 1, the apparatus for chilling a food product is shown generally by numeral 2. The food product 4, such as cut meat and/or poultry, is delivered to the chilling apparatus 2 by a conventional means such as a conveyor belt 6. The apparatus generally includes a storage compartment 10 for receiving the food product 4 and a food distribution device 12 which receives the food product 4 from the conveyor belt 6 and distributes the food product uniformly within the storage compartment 10 as explained hereinafter.

Figure 2:
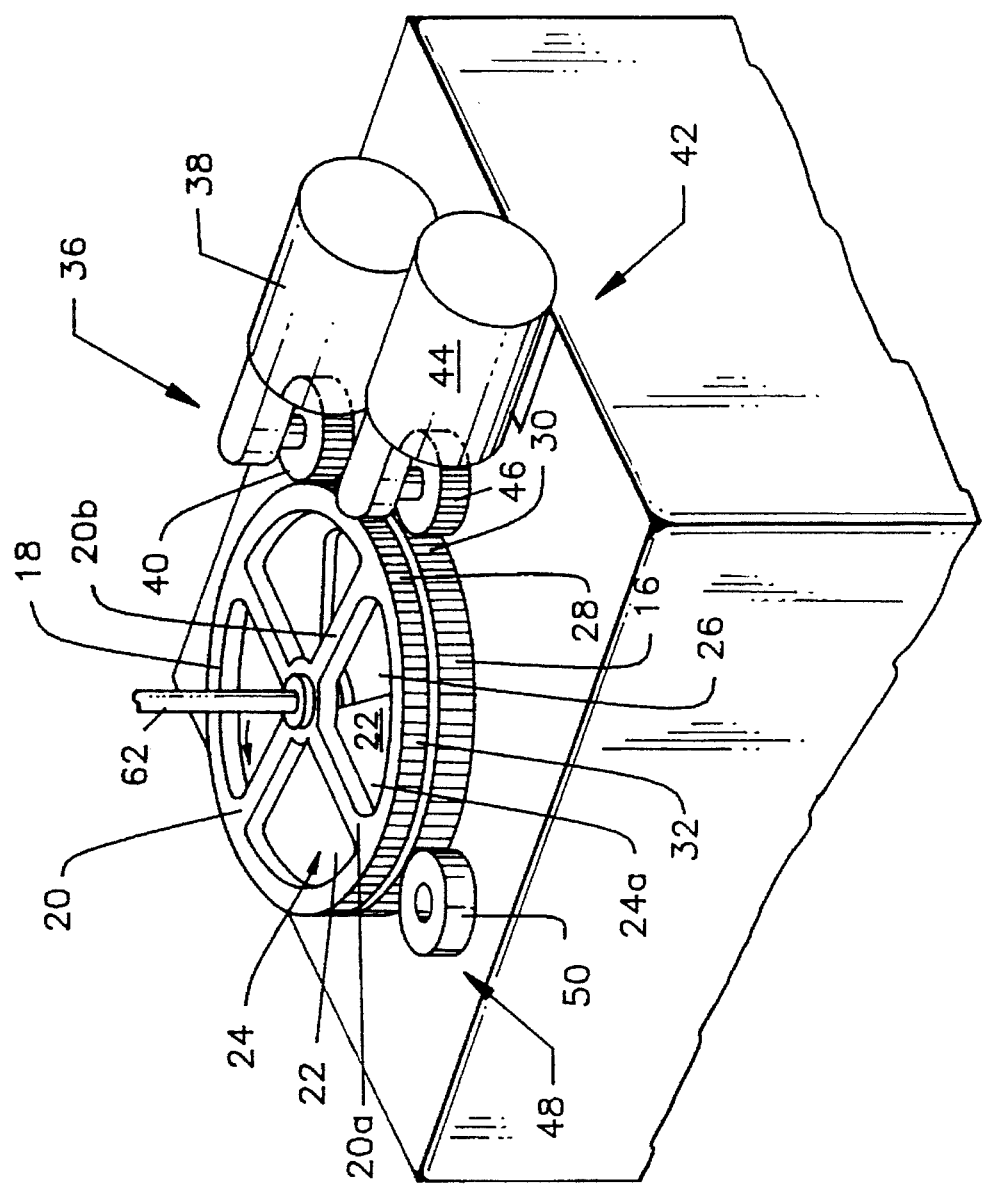
FIG. 2 is a perspective view of the food distribution means associated with the top of the food storage compartment for receiving the food product and for distributing the food product uniformly within the food storage compartment.

The food distribution device 12 includes a base 14, a first circular member 16 and a second circular member 18 as shown specifically in FIG. 2. The second circular member 18 includes at least one, preferably a plurality of spaced-apart partitions 20 (four partitions are shown) which together with the upper surface 22 of the first circular member 16 form a corresponding number of food receiving areas 24. The upper surface 22 of the first circular member 16 has an opening 26 therein which is of sufficient size to enable the food product 4 to pass therethrough and into the storage compartment 10.

The first circular member 16 and the second circular member 18 rotate in a non-congruent manner. That is, for example, the second circular member 18 may either rotate at a different speed than the first circular member 16 and/or rotate in different direction than the first circular member 16. The rotation of the respective circular members 16,18 in a non-congruent manner is designed to urge the food product 4 which is received in the food receiving areas 24 into the opening 26 by the partitions 20.

The relationship between the first circular member 16 and the second circular member 18 is best shown by reference to FIG. 2. When the food product 4 is received within a food receiving area 24a, the partitions 20a and 20b which border the food receiving area 24a rotate in a non-congruent manner such as by rotating at a speed greater than that of the first circular member 16. Accordingly, the food product is caused to move across the upper surface 22 of the first circular member 16 until the food product reaches the opening 26 and falls into the storage compartment 10. As previously indicated, the same results can be achieved by reversing the rotation of the second circular member 18 with respect to the first circular member 16.

Rotation of the first and second circular members 16,18 may be accomplished by a gear driving mechanism having respective gear wheels which engage the outer rim of the respective circular members. Referring to FIG. 2, there is shown the first circular member 16 having an outside edge 28 composed of gear teeth 30. The second circular member 18 has a corresponding outside edge 32 composed of similar gear teeth 34.

The gear teeth 34 of the second circular member 18 are engaged by a first gear drive 36 comprising a motor 38 and a gear wheel 40. In operation, the rotation of the gear wheel 40 causes the first circular member 16 to rotate in a like manner at a set speed. A similar gear drive 42 comprising a motor 44 and corresponding gear wheel 46 is provided for the first circular member 16 which causes the first circular member 16 to rotate at a desired speed.

In one embodiment the gear wheel 40 causes the second circular member 18 to rotate at a rate of speed different than that of the first circular member 16. In another embodiment, the gear wheel 40 may be caused to rotate in a direction opposite to that of the corresponding gear wheel 46 which controls movement of the first circular member 16. Accordingly, the food product which enters the food receiving area 24 will be contacted by a partition 20 bordering the food receiving area 24 and pushed along the surface 22 of the first circular member 16. Eventually, the food product 4 will be urged into the opening 26 and deposited within the storage compartment 10.

Gear drive 40 may be provided with respective ratchet clutches (not shown), known in the art, (e.g. model #400 manufactured by MAYR). The ratchet clutch serves to stop the motion of the second circular member 18 when the food product 4 is lodged between one of the partitions 20 and the side of the opening 26 in the upper surface 22 of the first circular member 16. This optional device is provided to prevent damage to the apparatus on the rare occasion when the food product 4 may become lodged between the first and the second circular members 16 and 18.

The food distribution device 12 may also be optionally provided with one or more, preferably three, guide wheels 48 which provide support for the first circular member 16. Each guide wheel 48 has an outer rim 50 which rotates and engages the outside edge 28 of the first circular member 16 to assure that the first circular member 16 rotates smoothly when in operation.

The food distribution system described above effectively transports the food product 4 through the opening 26 at spaced-apart intervals thereby distributing the food product 4 within the storage compartment 10 in a uniform manner. As a consequence, the food product 4 is evenly distributed throughout the entire volume of the storage compartment 10.

In another aspect of food chilling apparatus, there is provided a unique cooling device which relies on a cryogenic substance to cool the food product contained within the food storage compartment. A cryogen releasing device is attached to the underside of the first circular member and releases a cryogenic substance as the first circular member is rotated above the storage compartment.

Figure 3:
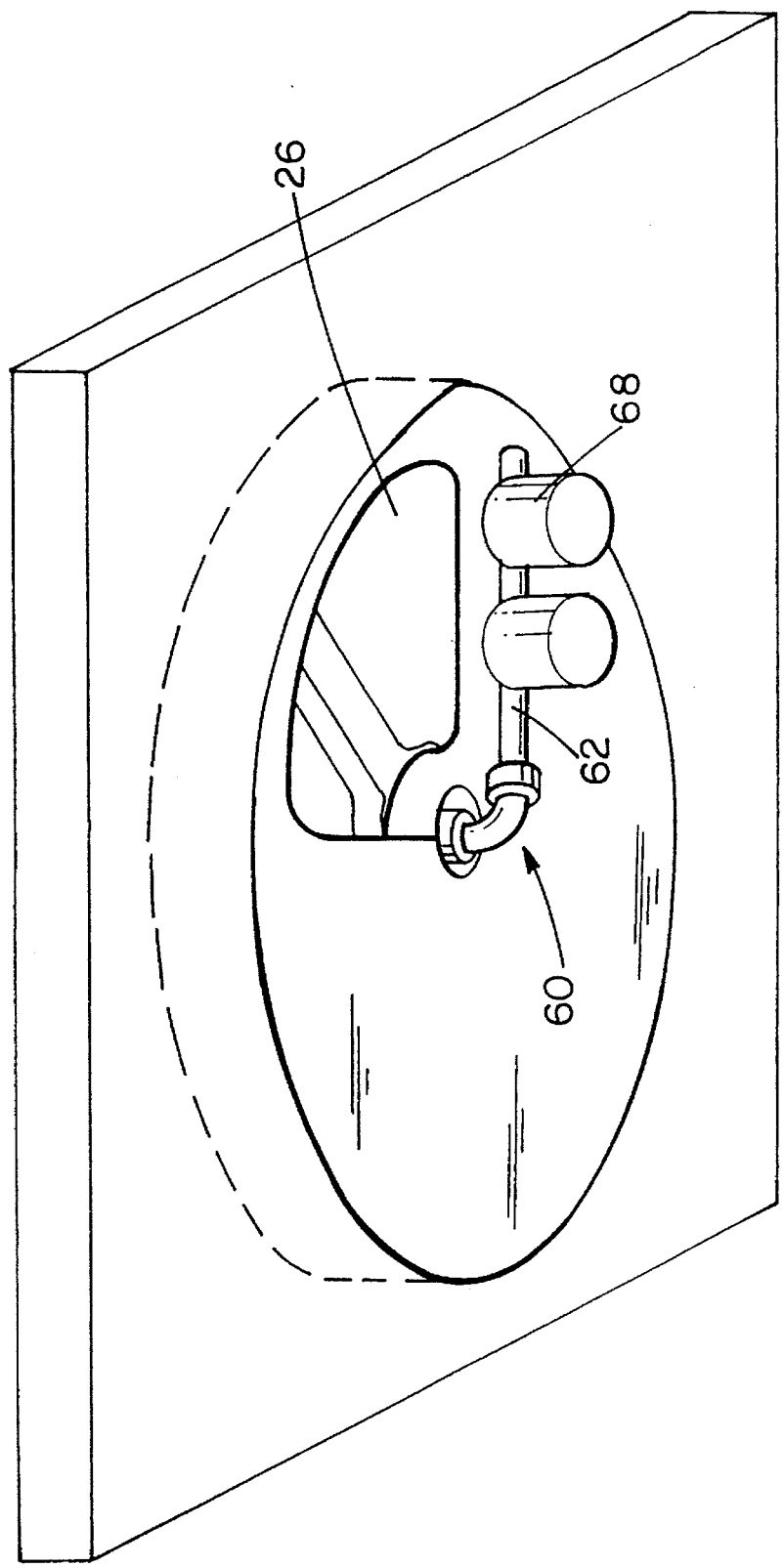
FIG. 3 is a side view of an embodiment of the cryogen releasing means for uniformly distributing a cryogenic substance into the food storage compartment as food is released through the opening of the food distribution means.

Referring to FIGS. 1–3, there is disclosed a cryogen releasing device 60 shown affixed to the underside of first circular member 16. The cryogen releasing device 60 is shown proximate to the opening 26 in the first circular member 16. It should be noted, however, that the cryogen releasing device 60 may be positioned anywhere along the underside of the first circular member 16.

The cryogen releasing device 60 includes a first conduit 62 and a second conduit 64 which are connected together by a coupling device 66. The second conduit 64 is connected to a source of cryogen (not shown). The first conduit 62 which extends upwards through the first and second circular members 16, 18 is connected to at least one device for releasing the cryogenic substance in the desired form for cooling.

Figure 4:
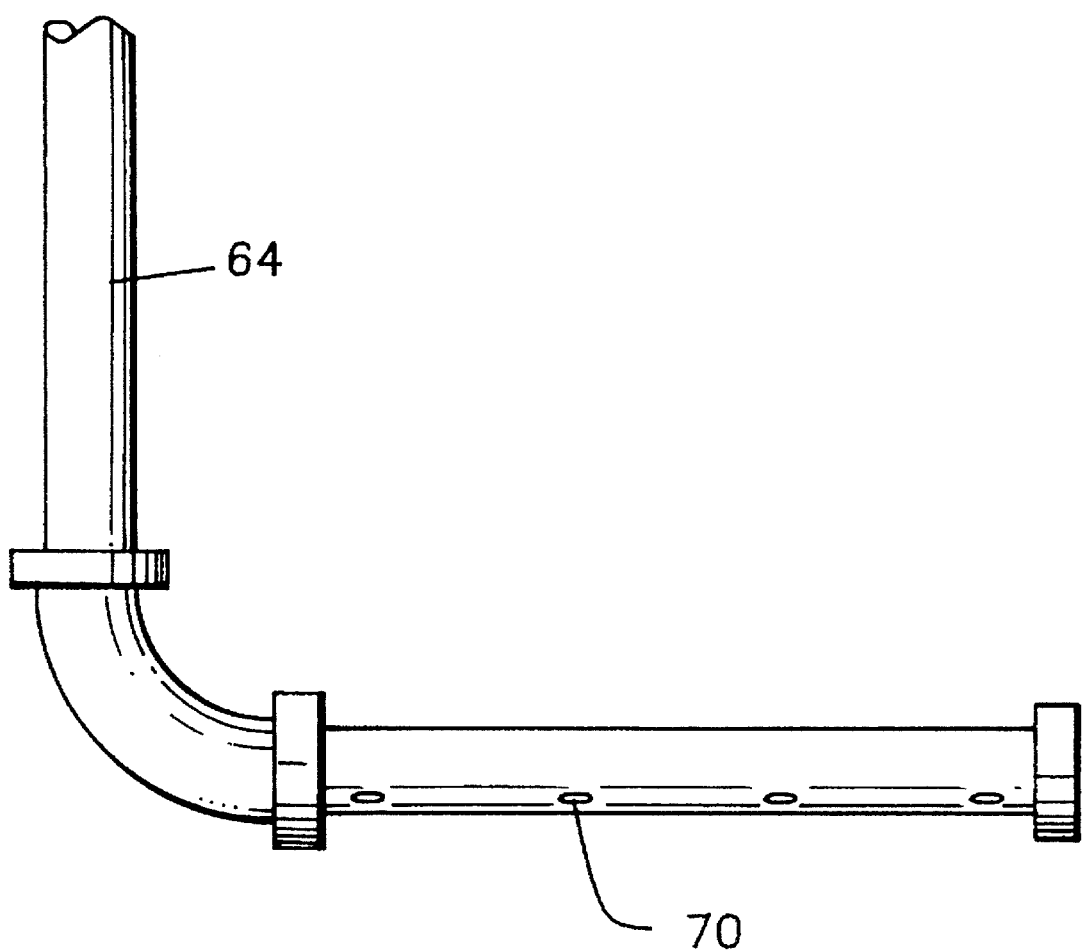
FIG. 4 is a side view of another embodiment of the cryogen releasing means.

As shown in FIGS. 3 and 4, when the cryogenic substance is carbon dioxide, at least one cone-shaped generator 68 is provided for forming solid flakes of carbon dioxide and releasing the flakes of carbon dioxide onto the food product contained within the vessel. The solid flakes of carbon dioxide are formed in a conventional manner. More specifically, carbon dioxide is generally shipped and stored in pressure vessels at 300 psig and 0° F., in liquid form. When cooling is needed, it is transferred via a pipe to an orifice. Upon injection through an orifice, the liquid changes state to a solid and gas at atmospheric conditions. The amount of solid formed is approximately 43%. The shape of the snow cones or snow generators 68 concentrate the solid carbon dioxide particles forcing them to collide and form larger particles referred to as snow. This snow then contacts the product to be cooled and sublimates giving up its cooling capacity. The cryogenic substance is released through the cones 68 as the cryogen releasing device is rotated in accordance with the rotation of the first circular member 16.

In an alternative embodiment, the cryogenic substance may be a liquid, such as liquid nitrogen. The first conduit 62 is provided with a series of spaced-apart openings 70 as shown in FIG. 4 to allow the liquid nitrogen to drip onto the food product within the storage compartment. Exhaust cryogen is released from the storage vessel through an exhaust port 74 as shown in FIG. 1.

The flow of the cryogenic substance to the cryogen releasing device 60 is controlled by a valve arrangement 72 shown generally in FIG. 1. The flow of the cryogenic substance may be controlled by adjusting the valve arrangement 72 to limit the amount of cryogenic substance entering the second conduit 64 to a percentage of the total flow capacity. For example, if the conduit 64 is capable of handling 50 pounds per minute of the cryogenic substance (e.g. carbon dioxide or nitrogen) at full production, then the valve arrangement 72 could be set at 50% open if only 25 pounds per minute of flow are needed.

Alternatively, the valve arrangement 72 can be turned on and off at spaced-apart intervals. As a result, the valve will be opened a percentage of the time and closed the remaining time. For example, if 50 pounds per minute of the cryogenic substance represented full capacity and only 75% of full capacity were desired, the valve arrangement 72 could be set in the open position for 45 seconds and in the closed position for 15 seconds by a conventional timing device (not shown). This requires manual adjustment of the cryogenic substance in response to any change in the flow rate of the food product.

In accordance with the present invention there is provided a device for measuring the rate of flow of the food product and for automatically adjusting the rate of release of the cryogenic substance in response to the rate of flow of the food product.

Figure 5:
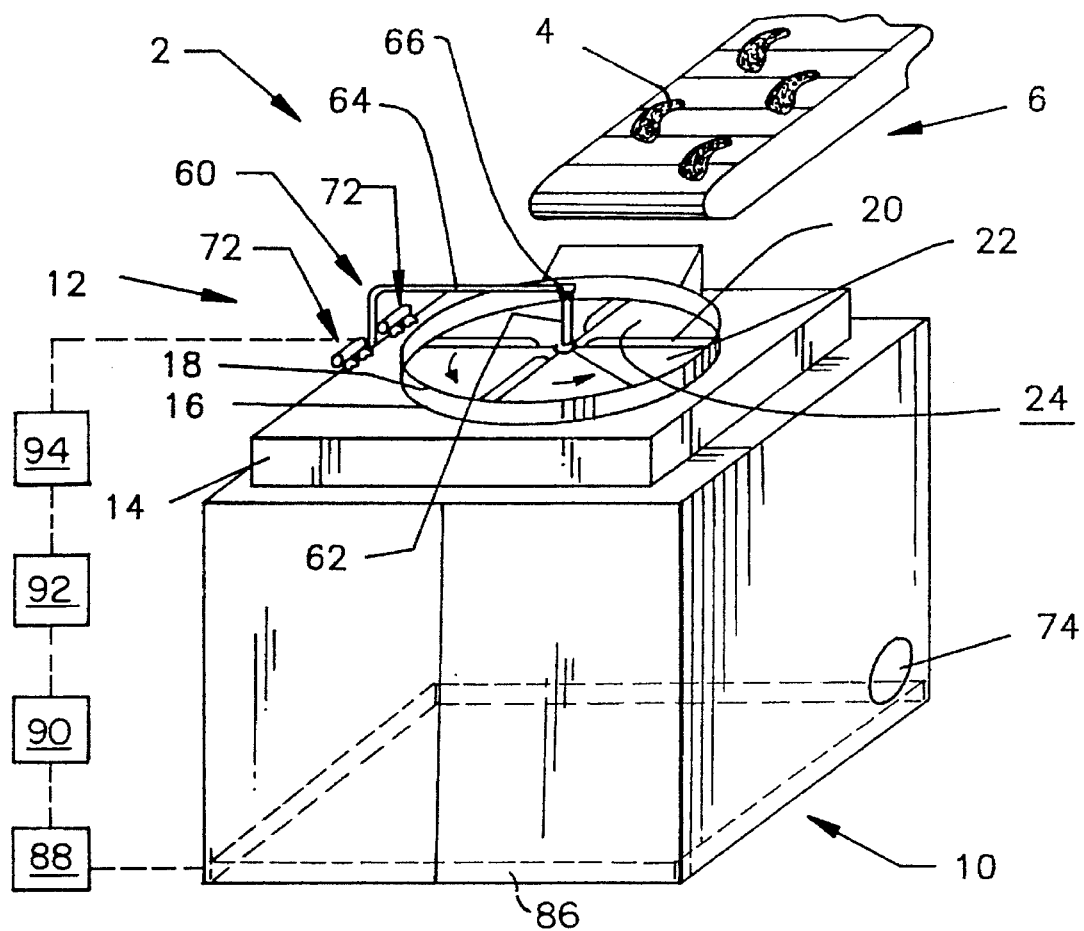
FIG. 5 is a perspective view of an embodiment of the invention for chilling a food product in which a device determining the rate of entry of the food product is located with the food storage compartment.
Figure 6:
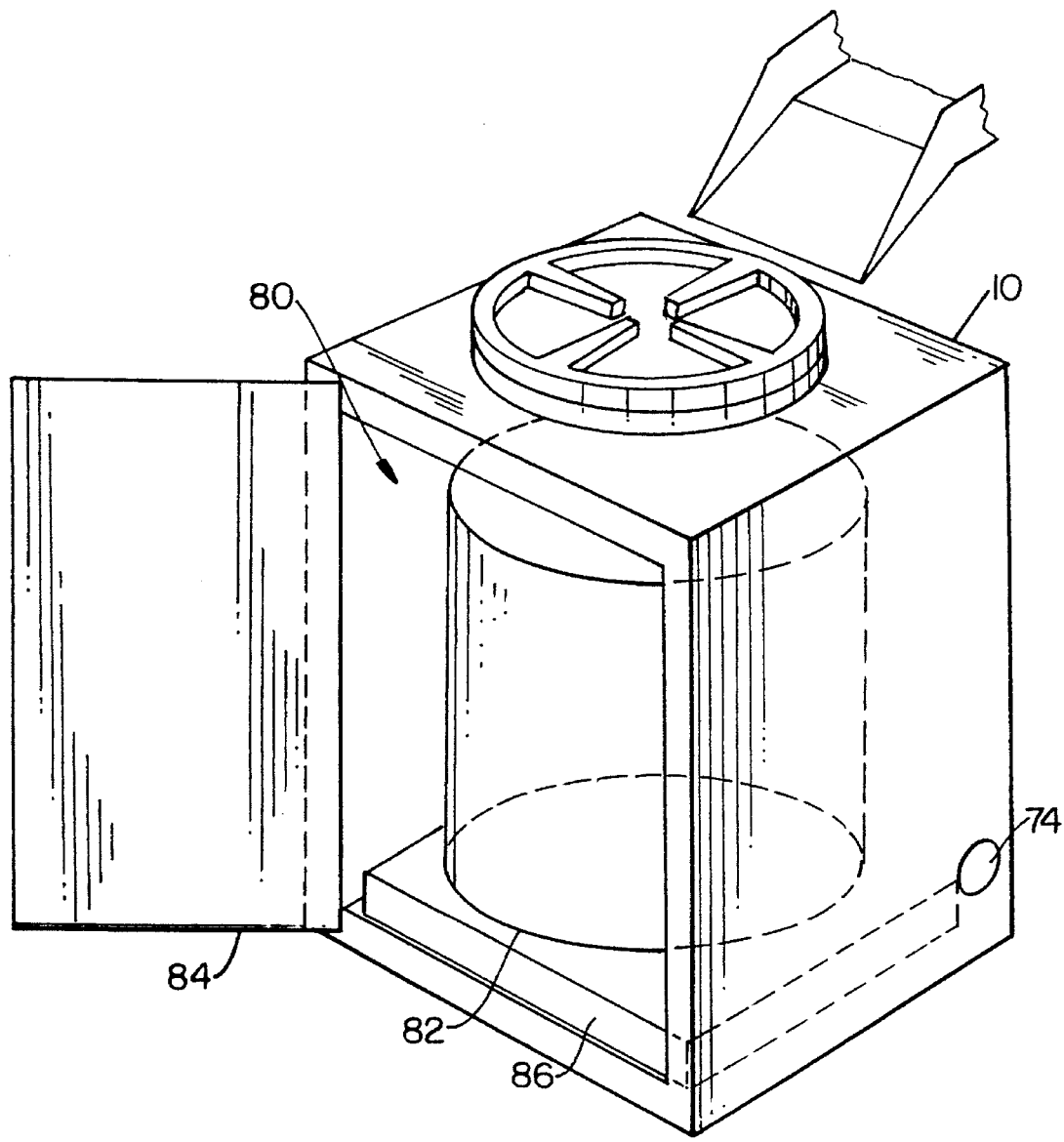
FIG. 6 is a perspective view similar to FIG. 1 showing a food storage bin for receiving the food product positioned atop a device which measures the amount of food product within the food storage bin.

In one aspect of the invention, a device for measuring the rate of flow of the food product is positioned on the floor of the food storage compartment. Referring to FIGS. 5 and 6, the food storage compartment is provided with an opening 80 (see FIG. 6) for insertion of a storage bin 82. The opening 80 is accessed by a door 84 which is closed when food is entering the food storage compartment and opened when the storage bin 82 is to be removed for unloading the food product.

The food storage compartment 10 is provided with a scale 86, such as a Model T4X4-5K Low Profile Floor Scale manufactured by Totalcomp Inc. The scale 86 is adapted to output a signal proportional to the amount of the food product entering the storage bin 82 (i.e. the signal emitted corresponds to the weight of the food product within the storage bin).

The scale 86 uses a strain gauge represented by numeral 88 to generate an electronic signal corresponding to the weight of the food product in the storage bin 82. A standard strain gauge may be used which measures strain as the ratio of the change of length caused by a strain to an unstressed reference length. An electronic signal is generated because the strain gauge changes resistance as it is stressed or compressed.

The strain gauge 88 emits an electronic signal. A strain gauge transmitter 90, such as a model SC-1390 Strain Gauge Transmitter manufactured by Totalcomp Inc. converts the change in resistance to a control signal which varies the current directly according to the amount of strain (e.g. from about 4 mA to 20 mA).

This signal is analyzed in a known programmable logic controller (PLC) 92, such as Model 8005CP-50 manufactured by Square D, Inc., which measures the rate of change of the 4 to 20 mA signal. The PLC outputs an electronic signal of variable power (e.g. from about 4 mA to 20 mA which is sent to a converter 94 that converts the electronic current signal to a pressure signal (e.g. in the range of 3 to 15 psi). The pressure signal generated by the converter 94 is then sent to the valve arrangement 72 such as a Model 807 Research Control Valve manufactured by Badger Meter, Inc.

The system described above measures the rate at which the food product enters the storage bin and generates a signal corresponding to the rate of entry which controls the amount of the cryogenic substance which is released from the valve arrangement 72.

Two methods of injecting the cryogenic substance may be developed from this system. The first method is to establish a fixed amount of the cryogenic substance injected for a given amount of the food product which is distributed into the storage bin. For example, assume that the amount of the cryogenic substance per minute necessary to chill the food product to the desired temperature is 0.1 pound. If the rate of distribution of the food product is 100 pounds per minute, then the valve arrangement 72 will release 10 pounds of the cryogenic substance per minute. If the rate of distribution of the food product is reduced to 50 pounds per minute, then the rate of cryogen release will correspondingly be decreased to 5 pounds per minute.

The second method of operation is to set the strain gauge transmitter at 4 mA corresponding to an empty storage bin (0 lbs of food product) and at 20 mA when the storage bin is filled with food product (e.g. 2200 pounds). Therefore, for every 100 pounds of food product which enters the storage bin there will be a corresponding increase of the electrical power of the signal by about 0.72 mA. The increase in amperage is detected with the programmable logic controller 92. Upon detecting an increase of about 0.72 mA, the PLC generates an electronic signal which opens the valve arrangement 72 for a set time sufficient to release 10 pounds of the cryogenic substance based on the same cryogen demand discussed above in connection with the first method.

In another embodiment of the invention, the measurement of the flow rate of the food product and the generation and transmission of corresponding signals to release the cryogenic substance from the valve arrangement takes place before the food product enters the food storage compartment.

Figure 7:
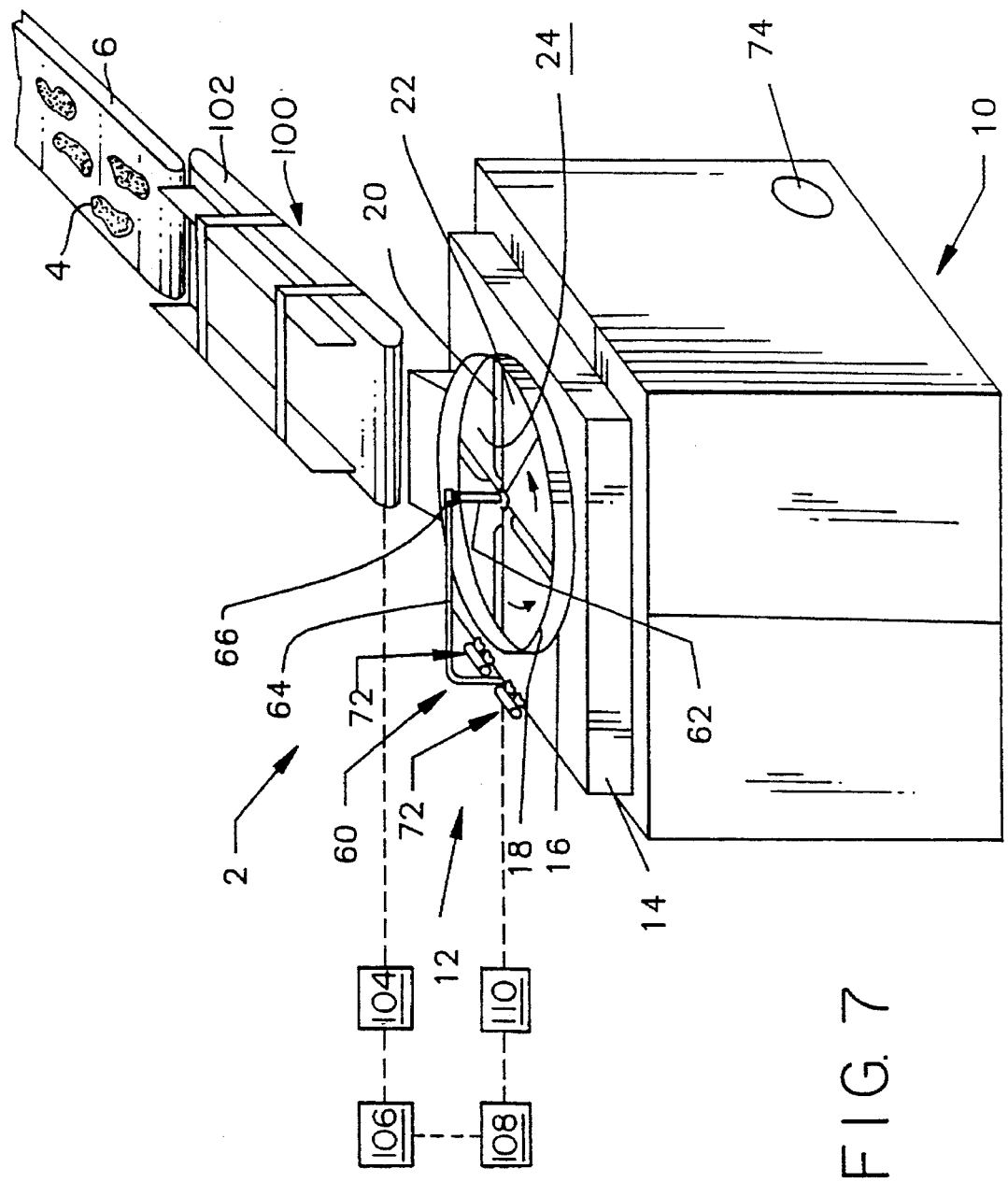
FIG. 7 is a perspective view of an embodiment of the invention in which the rate measuring device is located at the end of the conveyor belt and external of the food storage compartment.

Referring to FIG. 7, there is provided a device 100 which receives the food product 4 from the conveyor belt 6. The device 100, such as a weigh belt feeder (e.g. Model 202 12" Sanitary Feeder manufactured by AccuRate) includes a scale 102 which is of the type similar to the scale 86 described in connection with the embodiment of FIGS. 5 and 6. The scale 102 employs a strain gauge 104 to generate an electronic signal corresponding to the weight of the food product received from the conveyor 6. A strain gauge transmitter 106, such as Model SC-1390 Strain Gauge Transmitter manufactured by Totalcomp Inc., converts the change is resistance to a control signal. The signal is analyzed by a programmable logic controller 108 which measures the rate of change of product throughput. The PLC outputs an electronic signal of variable power which is sent to a converter 110 which converts the electrical current signal to a pressure signal. The pressure signal is then sent to the valve arrangement 72, such as a Model 807 Research Control Valve manufactured by Badger Meter, Inc., for release of the cryogenic substance according to the flow rate of the food product.

EXAMPLE 1

A storage compartment capable of housing approximately 2200 pounds of meat or poultry is employed for receiving the food product from a conveyor as shown in FIG. 1. The food product is supplied at a rate sufficient to fill the storage compartment in approximately fifteen minutes. The temperature of the food product entering the chilling apparatus is approximately 45° F. and the temperature of the food product within the storage compartment is required to be about 35° F. Employing turkey as an example, which has a specific heat of about 0.8 Btu/pound° F., requires the removal of 17,600 Btu in fifteen minutes corresponding to approximately 70,400 Btu/hr.

In order to remove this amount of heat, the apparatus as shown in FIG. 1 is supplied with liquid carbon dioxide which removes heat at the rate of 113 Btu/pound Since the removal of 70,400 Btu/hr is equivalent to 1173 Btu per minute, approximately 10.4 pounds of liquid carbon dioxide must be supplied to the storage vessel per minute in order to reduce the temperature of the turkey product from 45° F. to 35° F.

EXAMPLE 2

The same apparatus as described in Example 1 was employed for cooling turkey except that liquid nitrogen was used as the cryogenic substance with the cryogen releasing device shown in FIG. 4. Since liquid nitrogen removes heat at the rate of 85.6 Btu per minute, 13.7 pounds of liquid nitrogen per minute would be required to reduce the temperature of the turkey product from 45° F. to 35° F.

What is claimed:

1. Apparatus for chilling a food product comprising:
   (a) a food storage compartment for receiving the food product while in motion from a food distribution means and for storing the food product at rest;
   (b) food distribution means operatively engaged to the top of the food storage compartment for receiving the food product from a source and for uniformly distributing the food product within the food storage compartment;
   (c) cryogenic releasing means for releasing a cryogenic substance to cool the food product while the food product is contained within the food storage compartment; and
   (d) means for adjusting a rate at which the cryogenic substance is released in accordance with a rate at which the food product enters the food storage compartment.

2. The apparatus of claim 1 wherein the component (d) comprises means for measuring the weight of the food product entering the food storage compartment, means for generating a first signal corresponding to the weight of the food product, means for converting said signal into a second signal which is readable by the cryogen releasing means whereby a set amount of the cryogenic substance is released into the food storage compartment.

3. The apparatus of claim 2 wherein the weight measuring means comprises a scale and a strain gauge which generates a signal corresponding to the weight of the food product in the food storage compartment.

4. The apparatus of claim 3 wherein the means for generating the signal comprises means for converting the signal obtained from the strain gauge to a variable control signal, means for analyzing the control signal and generating an electronic signal corresponding to the control signal, means for converting the electronic signal to a pressure signal and means for releasing an amount of the cryogenic substance in response to the pressure signal.

5. The apparatus of claim 4 wherein the means for analyzing the control signal is a programmable logic controller.

6. The apparatus of claim 1 wherein the cryogen releasing means is operatively engaged to the underside of the food distribution means for uniformly releasing a cryogenic substance onto the food product as the food product is uniformly distributed within the food storage compartment to thereby cool the food product.

7. The apparatus of claim 2 wherein the food distribution means comprises:
   (a) a first circular member having an upper and lower surface and an opening therein sufficient for the food product to pass therethrough;
   (b) means for rotating the first circular member;
   (c) a second circular member positioned above the first circular member comprising at least one partition and together with the upper surface of the first circular member forming at least one food receiving area on the upper surface of the first circular member;
   (d) means for rotating the second circular member in a non-congruent manner with respect to the first circular member;
   whereby the food product which is placed on the upper surface of the first circular member is caused to fall through the opening in the first circular member into the food storage compartment when one of said partitions contacts the food product and urges said food product into said opening.

8. The apparatus of claim 7 wherein the means for rotating the first circular member rotates the first circular member at a speed different than that of the second circular member.

9. The apparatus of claim 7 wherein the means for rotating the first circular member rotates the first circular member in a different direction than the second circular member.

10. The apparatus of claim 3 wherein the cryogen releasing means comprises a conduit affixed to the lower surface of the first circular member and connected to a source of a cryogenic substance, and a releasing means operatively connected to the conduit and to the scale for releasing the cryogenic substance as the first circular member is rotated in accordance with the rate of flow of the food product.

11. The apparatus of claim 10 wherein the releasing means comprises a solid flake generator.

12. The apparatus of claim 10 wherein the releasing means comprises a plurality of openings in the conduit of sufficient size to enable a liquid cryogen to pass therethrough.

13. A method of chilling a food product comprising:

(a) providing a food storage compartment for receiving the food product while the food product is in motion and for storing the food product at rest;

(b) determining the rate at which the food product enters the food storage compartment; and (c) releasing a cryogenic substance into the food storage compartment at a selected rate corresponding to the rate the food product enters the food storage compartment.

14. The method of claim 13 comprising:

(a) measuring the weight of the food product entering the food storage compartment;

(b) generating a first signal corresponding to the weight of the food product;

(c) converting the first signal into a second signal; and (d) releasing a set amount of the cryogenic substance at a rate corresponding to the second signal.

15. The method of claim 14 wherein the weight of the food product is measured before entering the food storage compartment.

16. The method of claim 14 wherein the weight of the food product is measured after the food product has entered the food storage compartment.

17. The method of claim 14 comprising releasing a set amount of the cryogenic substance for a set amount of the food product which is measured.

18. The method of claim 14 comprising generating said first signal in response to a fixed amount of the food product.

* * * * *